Jan. 28, 1936.  H. D. STUCK  2,029,123

PROCESS OF FITTING JORDAN SHELL LININGS

Filed July 12, 1934  2 Sheets-Sheet 1

INVENTOR
Harold D. Stuck
BY Gardner W. Pearson
ATTORNEY

Jan. 28, 1936.   H. D. STUCK   2,029,123

PROCESS OF FITTING JORDAN SHELL LININGS

Filed July 12, 1934   2 Sheets-Sheet 2

INVENTOR
Harold D. Stuck
BY Gardner D. Pearce
ATTORNEY

Patented Jan. 28, 1936

2,029,123

UNITED STATES PATENT OFFICE 2,029,123

PROCESS OF FITTING JORDAN SHELL LININGS

Harold D. Stuck, Lawrence, Mass., assignor to John W. Bolton & Sons, Inc., Lawrence, Mass., a corporation of Massachusetts Application July 12, 1934, Serial No. 734,819

15 Claims. (Cl. 29—84)

The invention relates to the filling or linings of Jordan engines.

A Jordan engine includes a frustro-conical shell on the inside of which is a filling formed of knives or knife edges which project radially inward and a plug of frustro-conical shape which has knives or bars projecting outward radially and which revolves inside the shell.

Formerly these shell fillings were built up in the shell itself by putting in position alternately knives and wooden separators, cheek pieces and holding bars and tightening the knives and separators together by the action of wedges driven in from the large end. More recently, however, all metal fillings, such as described in his Patent No. 946,752 by Bahr, have been used, and fillings in which the knives and separators had holes and were strung on and held in position by wires or rods which passed through these holes, as see Abbe No. 235,844. Another type is such as shown in patent to Bolton No. 1,642,327 in which the knives and separators are held together by a thin metal jacket and still another type like patent to Martindale No. 1,494,265 where the knives and separators are held together by wires and babbitt.

These fillings have been formed in gangs of one-eighth, one-quarter or one-half circle and have also been made in complete circles of 360° but more often as a complete 360° filling, but with a longitudinal slot to permit the lining to be inserted in the shell and then expanded by means of a wedge driven into the slot.

A large proportion of fillings, whether of the old unassembled type or the later preconstructed type, use wooden separators between the knives, and the well known swelling of wood in water has been utilized to help hold the filling firmly in place and against rotation. The swelling of the wood, especially when confined circumferentially, pushes out radially against the inside of the shell and helps to prevent the filling from revolving with the plug.

In making a preconstructed or preassembled filling, it has been found desirable, if not necessary, to provide a mould or jig, corresponding in size with the inside surface of the shell to be fitted, and to use this as a mould for a cast filling or as a jig or form for assembling the knives and separators of a compound filling. The axis of a Jordan shell in place is horizontal and it is much easier to work with a mould or jig or form having a vertical axis.

In assembling the knives and woods of a preconstructed filling in a jig or form, it has been the universal custom to place in position, either around the whole circumference or with the ends resting against stops, a substantial number of knives and separators ending with oppositely disposed cheek pieces with adjoining straight faces, and then to drive in a fitting wedge between these faces so as to force the parts together, to fill voids and to make a close circumferential fit.

These wedges may be merely temporary and the process may be repeated several times to get the required tightness.

The parts may be held in place as described above by being strung on wires or by babbitt or in a jacket or they may be held at the ends.

These wedges are generally driven in by powerful sledge hammers or bars by repeated blows and it is obvious that the surfaces along which the wedge must pass must be free from any sort of obstructions such as bolts, nuts or anything of that kind and it is also obvious that when a wedge is started, the pressure is almost entirely at the large end of the assembly, being gradually transmitted to the small end as the wedge is driven in.

It is also obvious that there is great loss of pressure power from blows, between the wedge and the cheek pieces.

It is also obvious that the heavy pounding, necessary in driving in a wedge, is objectionable because it may displace the parts and may also damage and weaken the wooden parts and may preclude the use of certain types of separators which might resist the erosion of the paper stock but were too brittle to stand the pounding.

By applying great radial pressure, which may be of the hydraulic type, along substantially the entire length, and along the entire outside curved surface of three hundred and sixty degrees of one or more assemblies of knives and separators not only are the voids filled more thoroughly but an almost perfect fit for the shell can be made so that the preassembled filling can be slipped in place as a unit even without a wedge or if a slot is left for a wedge, the wedging to fit the shell is very slight.

This radial pressure is produced by forcing the assembly from the large to the small end of a truncated cone or a cone.

When and if the filling closely fits the shell, whether it is wedged in place or not wedged in place, if wooden separators are used and are so arranged that their outside faces come in contact with the shell, they will swell radially when soaked and serve as a powerful brake to stop the lining from turning with the plug.

By subjecting the whole assembly to a great but uniformly distributed, controlled pressure, voids are filled and if wooden or other compressible separators are used, they can be compressed so as to be elastic or beyond the elastic limit as desired.

This invention has to do with a new method and machine for fitting a section of Jordan shell lining for that part of the Jordan shell where it is to be used.

It may be used to fit any one of the three longitudinal sections each of which extends substantially 360° around the inside of a shell in a well known manner or it may be used in finishing or fitting a plurality of separate parts for a section which forms or is to form one of such complete 360° sections. It may be used in forming a complete section of 360° with or without a split for a wedge.

Preferably there is used a mould or form in the shape of a truncated cone preferably set up on its small end so as to be vertical. Such cone may be a great deal longer than the longitudinal length or height of the filling section to be fitted and may be made in sections.

The filling section is assembled in any way, either in the large end or outside, to form a complete circle and the knives and separators may be merely pressed together or they may be forced together, as by the use of wedges, or by the use of pressure or blows, or in any other way, to form a complete assembly in which the parts may be locked together or not locked or in which there is a split for a wedge or in which the circumference of the section is continuous.

After so assembling in the large end, by the use of a powerful plunger or suitable device, the whole assembly is forced down into the small end of the mould. The result of this forcing is, of course, that all of the knives and separators are crowded and fitted together uniformly of the entire length of each and around the entire circumference of the circle.

A number of separate sections or one continuous section, split or unsplit, can be used, but all are made up of metal knives or bars between which are separators of wood or other non-metallic material and the inside of the mould should preferably be smooth without ridges or depressions, and the outside of the assembly of knives and separators should also be of the same character because the preferred pressure may be from 10 to 40 tons which, by the process, is so distributed between the inside of the mould and the outside of the assembly that the assembly would collapse if it were not for the regularly arranged metal knives and also, in the preferred forms, of the metal connections, such as rivets, jacket, rods, etc. which connect the knives.

As the pressure is controllable and distributed, the strength of the finished filling is more uniform and there are fewer weak spots.

As the small end of the mould can be made to exactly correspond with that part of the shell into which the filling is to be fitted, the resulting filling section will fit perfectly provided its parts can be locked in place or otherwise held in place before it is removed from the mould. Glue or cement can be used between the knives and separators to assemble the filling and if the compression is either so little that there is no resulting elastic rebound or if the pressure is so great as to destroy the elasticity of the material, the whole section will retain its shape and size after it has been compressed and after it has been removed from the fitting mould.

The members may be assembled in a jacket in a manner similar to what is shown in patent to Bolton, No. 1,642,327 and the whole preassembly, including the jacket, can be accurately fitted for the shell for which it is intended.

Of course, the mould can be pushed over the assembly instead of the assembly being pushed into the mould.

The members can be assembled in a jig where they are glued together and this assembly can be fitted by compression in a suitable mould and after compression and fitting, the glue or cement alone can be trusted to hold the assembly together and to keep it in shape or bands or staples can be fastened to the ends in a manner to be described or the members may be assembled in the mould itself without glue. The assembly can then be compressed and fitted and held together by such bands or staples.

The members can be provided with coinciding grooves or slots in their outer edges and can be assembled in a special mould, into the small end of which they are forced after assembling, and they can be locked in place by pouring molten metal into these grooves.

A filling such as shown in patent to Martindale, No. 1,494,265 can be assembled and fitted in this way.

The members may be provided with coinciding slots in their ends and after compression and fitting, the assembly can be locked in place by curved bolts and nuts in a manner similar to the filling shown in patent to Abbe, No. 235,844.

The type of filling to which I prefer to apply this process and machine is that shown in my application for United States Letters Patent on Staggered riveted Jordan lining, Serial No. 729,192 pending herewith.

In the drawings, Fig. 1 is an isometric view of a machine in which the herein described process can be carried out.

Figure 2:
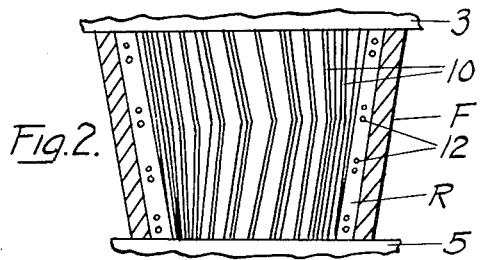
Fig. 2 is a vertical sectional view of a lining after compression or squeezing in a press.

In the drawings, A represents an assembling jig in which knives and separators as well as cheek pieces, wedges and other well known parts of a Jordan engine shell filling can be assembled in any known or unknown way and held together in any way until they can be transferred to a mould such as F or C to be described.

P represents a press of a type which I find convenient to use although many other types of presses might be used.

3 is a top plate or platen supported or held by columns such as 4, 4 to the cylinder 1 in which is a piston 2 with a plunger 5, the parts being of any well known hydraulic or other type in which tremendous pressure, preferably ten to forty tons, can be exerted in forcing plunger 5 up against platen 3.

Different types of assembled fillings are indicated by R, S, B, E, H, K and L. These will be described separately.

Figure 1:
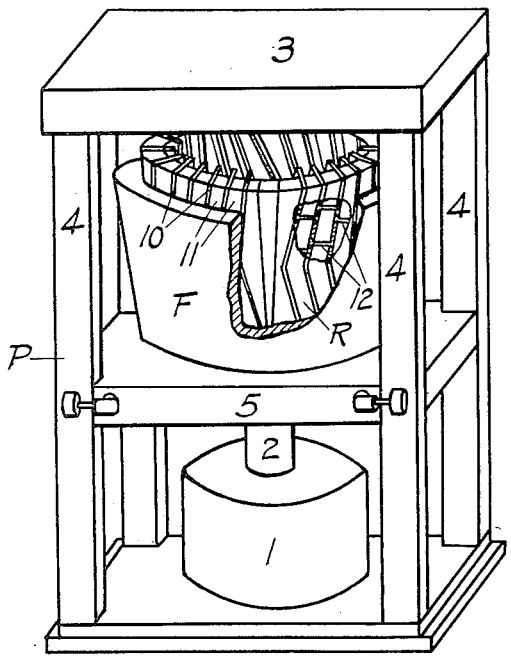

In Fig. 1 at R, I show a type of filling which is described in an application for Letters Patent filed by me, Harold D. Stuck and Philip A. De Nault, Serial No. 729,192 and pending herewith in which 10 represents the knives and 11 the separators while 12, 12 represent staggered rivets which hold the whole assembly together in a manner therein described. Such a filling R can be assembled without the use of any jig such as A and when assembled is of such size that when placed in the mould F, which mould corresponds in size with the shell into which the filling is to be fitted, it will stick out several inches.

The assembly R is placed in mould F with the plunger of the press retracted and then, as shown in Fig. 2, the plunger is forced out by many thousand pounds pressure, the result of which is that the assembly R is forced or squeezed down into the mould F.

With the riveted type of filling, the rivets are slightly bent by this process so that when the assembly is removed from the mould F it retains its shape and size.

Figure 3:
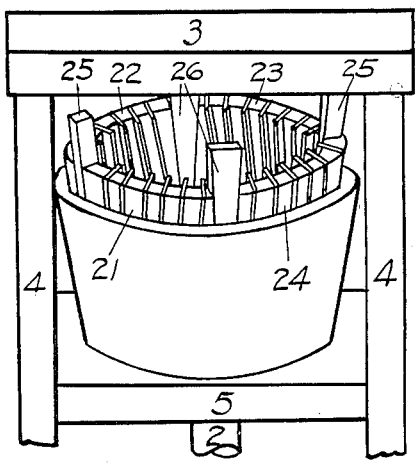
Fig. 3 is an isometric view showing an assembly of four quarter sections of lining with projecting wedges in a suitable press before compression.

In Fig. 3, I show four quarter-sections 21, 22, 23 and 24, the parts of which may be glued together when preassembled and then set in a mould like F with cheek pieces 25 and wedges 26, the whole projecting as shown. When the plunger of the press is operated, all parts of the assembly are forced into the small end of the mould and driven together by terrific force.

Figure 4:
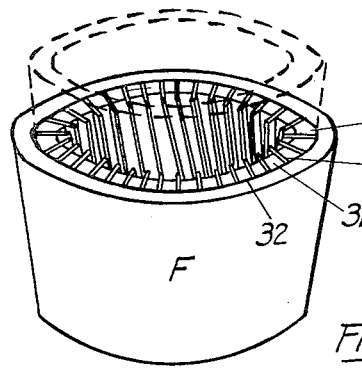
Fig. 4 is an isometric view of a mould in which is a glued or cemented assembly after compression.

In Fig. 4, I show a complete assembly B of 360°, the parts including knives 30 and separators 31 being held together by glue 32 only.

Figure 5:
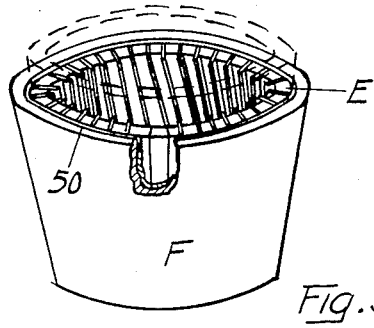
Fig. 5 is an isometric view of a mould in which is a jacketed assembly after compression.

In Fig. 5, I show an assembly E in which the parts are held together by a thin jacket 50 which is squeezed with them.

Figure 6:
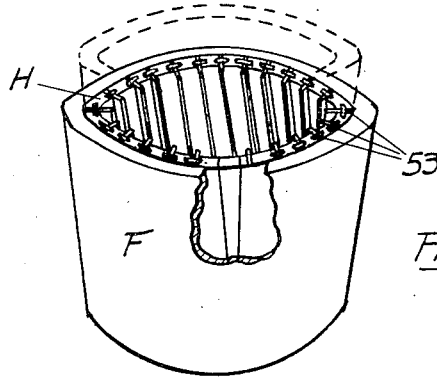
Fig. 6 is an isometric view of a mould in which is an assembly after compression and after being fastened together by staples at the end and 6A shows another method of fastening.

In Fig. 6 at H, I show an assembly in which the parts are held together by staples 53 driven into the end after squeezing.

Figure 6A:
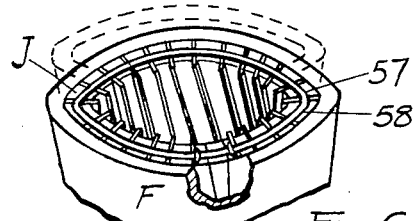

In Fig. 6A at J, I show an assembly in which the parts are held together by a band 57 set into coinciding grooves 58 in the ends of the members. Such grooves can be cut by putting the mould and assembly on a lathe and cutting the grooves 58 all at one time.

Figure 7:
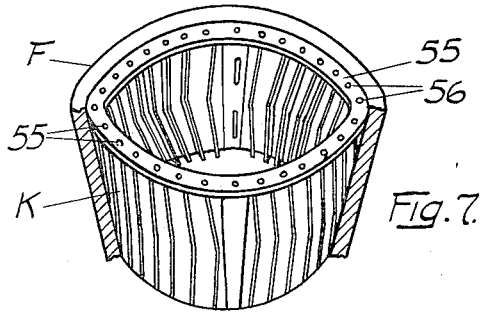
Fig. 7 is an isometric view of a mould partly in section with an assembled filling after compression and after a band has been nailed in place at one end.

In Fig. 7 at K, I show an assembly in which the parts are held together by flat rings such as 55 held to the ends by nails such as 56 after squeezing.

In Figs. 4, 5, 6, 6A and 7, the full lines show the assembly after being pushed into the small end of the mould and in Figs. 4, 5, 6 and 6A, the dotted lines show the starting position.

Figure 8:
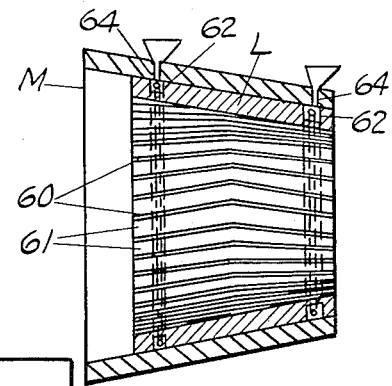
Fig. 8 is a vertical sectional view of a special mould into which one type of filling has been forced, the mould being then turned on its side, and showing funnels in place for directing melted metal into grooves in the filling.

In Fig. 8 at L, I show the knives 60 and separators 61 provided with coinciding grooves 62 around their peripheries. After the assembly L has been forced into a special mould M by the press P, as in the other cases, the grooves 62 register with holes 64 through the mould M and through these holes melted metal such as babbitt is poured so that the grooves 62 are filled and the whole assembly is firmly held together.

While this process is particularly useful in subjecting a Jordan shell filling section to tremendous pressure which forces it into the small end of a mould, the axial pressure being thereby converted into radial pressure or pressure towards the center, it is obvious that the process can be repeated. In fact, instead of forcing the knives and separators together by wedges or by any other means, in making the preliminary assembly, the knives, separators, cheek pieces and wedges can all be merely placed in the form or jig and glued together or held together in any other way or in fact they can be assembled in the pressure mould itself. Depending on the taper of the conical mould and of the corresponding Jordan shell, such assembly can be radially compressed or condensed only once or the process can be repeated.

With the riveted type, the rivets are slightly bent by the squeezing and with the jacketed type, the metal jacket is slightly intruded or shrunk and in both cases, the metal holds the shape so that the assembly can be taken from the first mould and pressed or squeezed into a second and smaller mould and so on within reasonable limits.

Figure 9:
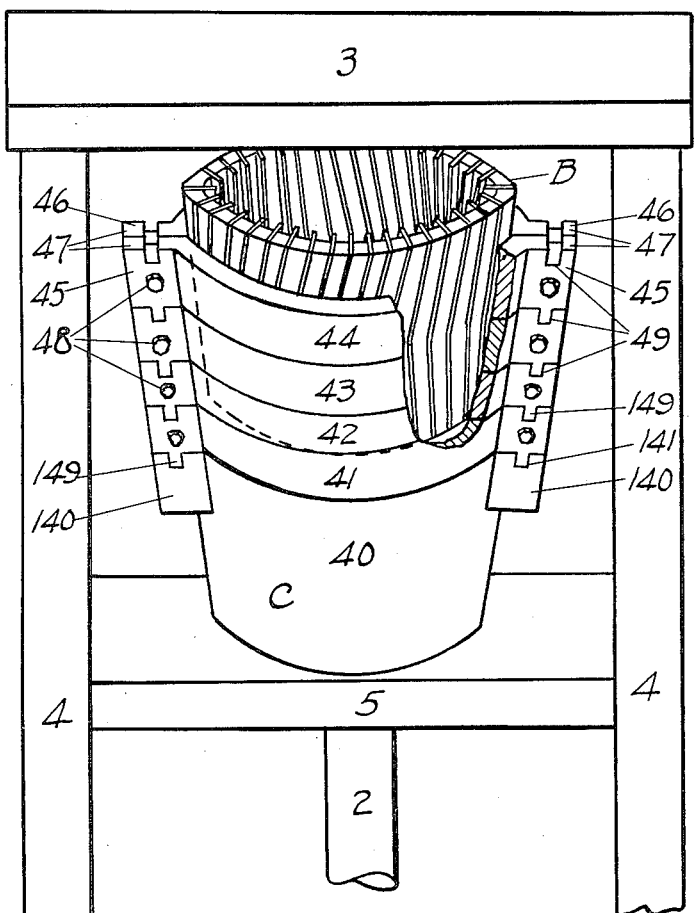
Fig. 9 is an isometric view similar to Fig. 1 of a sectional mould in a press, the parts being broken away for clearness.
Figure 10:
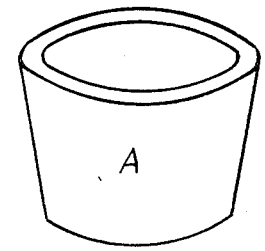
Fig. 10 is an isometric view of an assembling jig.

In Fig. 9 is shown a sectional mould C which is made up of the small section 40 which corresponds with the ultimate size of the filling and resting upon this successively are a plurality of split rings 41, 42, 43, 44 each of which is made up the same as 44 comprising two sections such as 45 and 46 each having on each side projecting ears such as 47, 47 held together by bolts such as 48 and each having in the top a recess 49 and at the bottom a tongue 149 which fits a corresponding recess in the section next below. Section 40 need not be split, but may have the ears 140, 140 in the upper part of which are the recesses 141 similar to 49.

As shown in Fig. 9, the mould C is built up of the sections 40, 41, 42, 43, 44, and the inside faces of these successive sections form a smooth and perfect truncated cone. Any of the assemblies such as B can be set in the top so that it projects above the top section 44.

Pressure is applied and the plunger 5 forces mould C upward and the assembly down flush with the top of section 44. The pressure can then be released, the bolts 48, 48 removed and the entire top annular section 44 made up of the parts 45 and 46 can be lifted so that tongues 149 will be released from recesses 49 and the whole top section 44 can be removed. This, of course, leaves the assembly B compressed to a certain degree but sticking up above the next annular mould section 43. The process is repeated until finally assembly B is squeezed down into the smallest section 40 of mould C.

In the claims, the word members includes all the compound parts of a shell lining, such as knives, separators, cheek pieces, wedges, rivets, glue, jacket and any other parts which help to complete a truncated cone.

Figure 11:
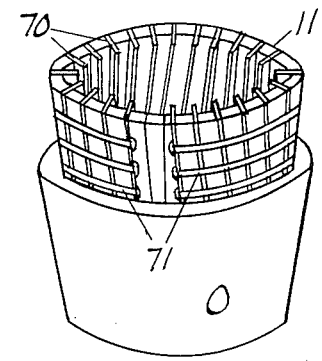
Fig. 11 is an isometric view of a mould in which is an all metal skeleton filling after shaping or fitting.

As shown in Fig. 11 a pre-formed lining N made up of knives 70 welded or otherwise fastened outside to hoops or rings 71 such as described in my application filed February 4, 1935, Serial No. 4,850 on Fused Jordan lining and process of making, pending herewith, either cold or hot, with wooden separators 11 between the metal knives, can be forced into a mould O and, whether the material is compressed or not, the assembly, if distorted, is trued or shaped and fitted, any excess of metal being taken care of in the spaces of the gridiron.

I claim:

1. The process of fitting the knives and separators of a preconstructed Jordan engine shell lining section which consists of placing the knives and separators in the large end of a truncated conical mould and of forcing the assembly into the small end of such mould.

2. The process of fitting the knives and separators of a preconstructed Jordan engine shell lining section which consists of placing the knives and separators in the large end of a truncated conical mould and of forcing the assembly into the small end of such mould and of locking the assembly together so as to retain its smaller size.

3. The process of fitting the members of a preconstructed Jordan engine shell lining section which consists of placing them in the large end of a truncated conical mould and of forcing the assembly into the small end of such mould.

4. The process of fitting the members of a preconstructed Jordan engine shell lining section which consists of placing them in the large end of a truncated conical mould and of forcing the assembly into the small end of such mould and of locking the assembly together so as to retain its smaller size.

5. The process of fitting the members of a preconstructed Jordan engine shell lining section which consists of assembling said members and of then placing the assembly in the large end of a truncated conical mould and of then forcing the assembly towards the small end of such mould.

6. The process of fitting the members of a preconstructed Jordan shell lining section which consists of assembling them and then placing the assembly in the large end of a truncated conical mould and of then forcing the assembly towards the small end of such mould and of then locking the assembly together so as to retain its smaller size.

7. The process of fitting a preconstructed Jordan shell lining section which consists of assembling and holding together its members and then bodily transporting and placing the assembly in the large end of a truncated conical mould and of then forcing the assembly towards the small end of such mould and of then locking the assembly together so as to retain its smaller size.

8. The process of fitting a preconstructed Jordan shell lining section which consists of assembling its members and then bodily transporting and placing the assembly in the large end of a truncated conical mould and of then forcing the assembly towards the small end of such mould.

9. The process of shaping a bodily transportable preconstructed Jordan shell lining which consists of placing it in the large end of a truncated conical mould and of then forcing it towards the small end of the mould by application of a steady, controlled pressure.

10. The process of shaping a bodily transportable preconstructed Jordan shell lining which consists of placing it in the large end of a truncated conical mould and of then forcing it towards the small end of the mould.

11. The process of shaping a bodily transportable preconstructed Jordan shell lining which consists of inserting its small end in the large end of a truncated conical mould and then forcing the mould and lining together.

12. The process of shaping and fitting a section of a bodily transportable preconstructed Jordan shell lining which consists of making a complete truncated conical assembly of metal knives and non-metal separators with a smooth outside and inserting the small end of this assembly in the large end of a truncated conical mould with a smooth inside surface and then forcing the mould and lining together.

13. The process of finishing and fitting a bodily transportable preconstructed section or sections of a Jordan shell lining, each section made up of metal knives and non-metal separators, the metal knives of each section being firmly fastened together by metal members which consists of assembling such section or sections and completing a truncated conical assembly with a smooth outside surface with its small end in the large end of a truncated conical mould which has a smooth inside surface; and of then forcing the mould and lining together.

14. The process of finishing and fitting a bodily transportable preconstructed section or sections of a Jordan engine shell lining, each section made up of metal knives and non-metal separators, the metal knives of each section being firmly fastened together by metal members which consists of assembling such section or sections and completing a truncated conical assembly which is slightly larger than the shell into which it is to be fitted and with a smooth outside surface with its small end in the large end of a truncated conical mould which is the exact size of the shell into which the assembly is to be fitted and which has a smooth inside surface; and of then forcing the mould and lining together.

15. The process of finishing and fitting a bodily transportable preconstructed section or sections of a Jordan engine shell lining, each section made up of metal knives and non-metal separators which consists of assembling such section or sections and completing a truncated conical assembly which is slightly larger than the shell into which it is to be fitted and with its small end in the large end of a truncated conical mould which is the exact size of or slightly smaller than the shell into which the assembly is to be fitted; and of then forcing the mould and lining together.

HAROLD D. STUCK.